US012611585B2

(12) United States Patent
Jolliffe et al.

(10) Patent No.: US 12,611,585 B2
(45) Date of Patent: **\*Apr. 28, 2026**

(54) BALL GAME APPARATUS

(71) Applicant: World Golf Systems Limited, Watford (GB)

(72) Inventors: David Victor Jolliffe, Northwood (GB); Steven Paul Jolliffe, Northwood (GB)

( \* ) Notice: Subject to any disclaimer, the term of this patent is extended or adjusted under 35 U.S.C. 154(b) by 363 days.

This patent is subject to a terminal disclaimer.

(21) Appl. No.: 18/217,473

(22) Filed: Jun. 30, 2023

(65) Prior Publication Data

US 2023/0338814 A1     Oct. 26, 2023

Related U.S. Application Data

(63) Continuation of application No. 15/743,269, filed as application No. PCT/GB2016/052069 on Jul. 8, 2016, now Pat. No. 11,724,172.

(30) Foreign Application Priority Data

Jul. 9, 2015    (GB) ..................................... 1512037

(51) Int. Cl.
| | | |
|---|---|---|
| *A63B 43/00* | (2006.01) | |
| *A63B 37/00* | (2006.01) | |
(Continued)

(52) U.S. Cl.
CPC ...... *A63B 71/0605* (2013.01); *A63B 37/0003* (2013.01); *A63B 43/00* (2013.01);
(Continued)

(58) Field of Classification Search
CPC . A63B 71/0605; A63B 37/0003; A63B 43/00; A63B 43/004; A63B 71/0622;
(Continued)

(56) References Cited

U.S. PATENT DOCUMENTS

| | | | | |
|---|---|---|---|---|
| 3,782,730 A | * | 1/1974 | Horchler | .............. A63B 43/008 |
| | | | | 342/385 |
| 4,516,770 A | | 5/1985 | Brookes et al. | |
(Continued)

FOREIGN PATENT DOCUMENTS

| | | |
|---|---|---|
| JP | 2007014671 A | 1/2007 |
| JP | 2011224284 A | 11/2011 |
(Continued)

*Primary Examiner* — Nini F Legesse
(74) *Attorney, Agent, or Firm* — Neal, Gerber & Eisenberg LLP

(57) ABSTRACT

A ball game apparatus in which movements of a coded ball are detected by detector units and an automatic indication of a player's score is given, where data relating to the ball are stored in a database connected to the detector units, the data including the code of a ball and a code relating to a player to whom the ball has been allocated, the ball being configured to temporarily store, and to intermittently transfer to the detector units and thence to the database, data relating to the ball's movements. A rechargeable battery is contained within the ball, and is arranged to be charged by a battery charging system. Features of the game may be controlled by means of a player's mobile telephone.

20 Claims, 2 Drawing Sheets

(51) Int. Cl.
    *A63B 71/06*         (2006.01)
    *H02J 7/00*          (2006.01)
    *H02J 50/10*        (2016.01)

(52) U.S. Cl.
    CPC ........ *A63B 43/004* (2013.01); *A63B 71/0622*
        (2013.01); *H02J 7/0013* (2013.01); *H02J*
        *7/0044* (2013.01); *H02J 50/10* (2016.02);
        *A63B 2220/12* (2013.01); *A63B 2220/80*
        (2013.01); *A63B 2220/805* (2013.01); *A63B*
        *2220/806* (2013.01); *A63B 2225/15* (2013.01);
        *A63B 2225/20* (2013.01); *A63B 2225/30*
        (2013.01); *A63B 2225/50* (2013.01); *A63B*
        *2225/54* (2013.01)

(58) Field of Classification Search
    CPC ............ A63B 2220/12; A63B 2220/80; A63B
        2220/805; A63B 2220/806; A63B
        2225/15; A63B 2225/20; A63B 2225/30;
        A63B 2225/50; A63B 2225/54; A63B
        69/0055; A63B 2209/08; A63B 2220/10;
        A63B 2220/58; A63B 2220/72; A63B
        2220/801; A63B 2220/803; A63B
        24/0087; A63B 69/36; H02J 7/0013;
        H02J 7/0044; H02J 50/10; G06F 9/542;
        H04W 84/18
    USPC ......................................... 473/199, 353, 409
    See application file for complete search history.

(56)            References Cited

U.S. PATENT DOCUMENTS

| 4,528,548 | A | | 7/1985 | Oberan |
| 4,673,183 | A | | 6/1987 | Trahan |
| 5,342,053 | A | | 8/1994 | Smith |
| 5,370,389 | A | | 12/1994 | Reising |
| 5,413,345 | A | * | 5/1995 | Nauck ................ A63B 24/0021 |
| | | | | 348/157 |
| 5,439,224 | A | | 8/1995 | Bertoncino |
| 5,445,374 | A | | 8/1995 | Clark, Jr. |
| 5,487,542 | A | | 1/1996 | Foley |
| 5,505,452 | A | | 4/1996 | Meaden |
| 5,582,550 | A | | 12/1996 | Foley |
| 5,626,531 | A | | 5/1997 | Little |
| 5,632,687 | A | | 5/1997 | Bunyi |
| 5,653,642 | A | | 8/1997 | Bonacorsi |
| 5,743,804 | A | | 4/1998 | Bacon |
| 5,743,815 | A | | 4/1998 | Helderman |
| 5,820,484 | A | * | 10/1998 | Terry ................ A63B 37/0003 |
| | | | | 473/356 |
| 5,836,829 | A | | 11/1998 | Van et al. |
| 5,860,648 | A | | 1/1999 | Petermeier et al. |
| 5,916,033 | A | | 6/1999 | Doherty |
| 5,976,038 | A | | 11/1999 | Orenstein et al. |
| 6,113,504 | A | | 9/2000 | Kuesters |
| 6,270,433 | B1 | | 8/2001 | Orenstein et al. |
| 6,299,553 | B1 | | 10/2001 | Petuchowski et al. |
| 6,322,455 | B1 | | 11/2001 | Howey |
| 6,337,560 | B1 | * | 1/2002 | Kalogeropoulos ... H02J 7/0071 |
| | | | | 320/160 |
| 6,338,685 | B1 | | 1/2002 | Posluszny |
| 6,348,017 | B1 | | 2/2002 | Yates |
| 6,607,123 | B1 | | 8/2003 | Jollifee et al. |
| 7,040,998 | B2 | | 5/2006 | Jolliffe et al. |
| 7,391,182 | B2 | | 6/2008 | Barbeau et al. |
| 7,952,322 | B2 | | 5/2011 | Partovi et al. |
| 8,257,189 | B2 | * | 9/2012 | Koudele ................ A63B 43/00 |
| | | | | 473/409 |
| 8,905,855 | B2 | | 12/2014 | Fitzpatrick et al. |
| 9,498,680 | B2 | * | 11/2016 | Luciano, Jr. ......... A63B 43/004 |
| 9,808,677 | B2 | | 11/2017 | Jolliffe et al. |
| 10,076,685 | B2 | * | 9/2018 | King ....................... H02J 50/90 |
| 11,724,172 | B2 | * | 8/2023 | Jolliffe .................. A63B 43/00 |
| | | | | 473/199 |
| 2002/0091017 | A1 | | 7/2002 | Kuesters |
| 2003/0228934 | A1 | | 12/2003 | Corzilius et al. |
| 2007/0026968 | A1 | | 2/2007 | Ratcliffe |
| 2009/0280920 | A1 | | 11/2009 | Rankin |
| 2010/0069181 | A1 | | 3/2010 | Lin |
| 2010/0285903 | A1 | | 11/2010 | Nicodem |
| 2011/0159977 | A1 | | 6/2011 | Pelz |
| 2011/0237367 | A1 | | 9/2011 | Kodama et al. |
| 2011/0304497 | A1 | | 12/2011 | Molyneux et al. |
| 2012/0052971 | A1 | | 3/2012 | Bentley |
| 2013/0274040 | A1 | | 10/2013 | Coza et al. |
| 2014/0081940 | A1 | | 3/2014 | Everett et al. |

FOREIGN PATENT DOCUMENTS

| WO | 2010065886 A1 | 6/2010 |
| WO | 2013156778 A1 | 10/2013 |
| WO | 2014008202 A1 | 1/2014 |

* cited by examiner

BALL GAME APPARATUS

This application is a continuation of U.S. patent application Ser. No. 15/743,269, filed on Jan. 9, 2018; which is a national stage entry of PCT Application No. PCT/GB2016/ 052069, filed on Jul. 8, 2016; which claims priority to GB App. No. 1512037.1, filed in Great Britain on Jul. 9, 2015; all of which are incorporated by reference in their entirety.

The present invention relates to a ball game apparatus. More particularly it relates to apparatus in which the motion of a ball is detected and an indication of the players' scores are given. An indication may be given of inadvertent and/or other movements of the ball which do not correspond to the rules of the game.

International patent application WO 2013/156778 discloses a golfing game in which a control device determines a predetermined range of allowable movements of a golf ball. Actual movements of the ball are sensed and a comparison is made as to whether they fall within the predetermined range.

Aspects of the present invention seek to provide an improved ball game apparatus. Aspects of the present invention seek to provide a golf facility incorporating one or more golf holes comprising the above ball game apparatus and a reception area. The reception area can include one or more of: means for charging the batteries of coded golf balls; means for switching on the golf balls from a dormant condition; means for providing a player code to a golf ball; means for allocating a profile to a golf ball depending upon the type of player, one or more vending machines which can be actuated by a coded golf ball, a central database which stores information relating to the various functions and a central control unit which controls the various functions accordingly.

According to a first aspect of the present invention, there is provided a ball game apparatus in which movements of a coded ball are detected by detector units and an automatic indication of a player's score is given, wherein data relating to the ball are stored in a database connected to the detector units, the data including the code of a ball and a code relating to a player to whom the ball has been allocated, the ball being configured to temporarily store, and to intermittently transfer to the detector units and thence to the database, data relating to the movements of the ball.

The database preferably stores data relating to a history of charging cycles which have been applied to a battery within the ball. This enables it to be monitored when a battery within a ball needs replacing.

The apparatus may further comprise a mobile communication device, such as a player's mobile telephone, which is configured to indicate the player's score and/or to influence other parts of the apparatus. The ability to use a mobile telephone makes it easy for players to interact with the game. The ability to control other parts of the apparatus, such as features of a novelty golf game, makes the game more interesting for players.

In preferred embodiments, the ball has a circuit which transmits signals which vary in power in dependence upon the current motion of the ball and/or each detector unit transmits signals which vary power in dependence upon the proximity of the nearest ball. Using reduced power in the ball has the advantage of conserving battery power. Varying the power transmitted by detector units has the advantage of avoiding interference between adjacent holes of a golf facility incorporating the ball game apparatus.

The apparatus may include a reading apparatus configured to read the data from the ball at the start and/or at the end of a game. The reading apparatus preferably includes an activator unit which is configured to switch the ball between an "on" and an "off" condition.

Movement of the ball may be recorded throughout a game by video cameras which are connected to a control centre. In addition, one or more video screens may be are distributed around a course on which the game is played, the screens being connected to one or more respective cameras and/or to the control centre for selected replay.

Where the ball game apparatus is part of a golf facility, the facility has a relatively large plurality of coded golf balls.

According to a second aspect of the present invention, there is provided a golf facility comprising one or more of:
(i) means for charging batteries within the balls before a game;
(ii) means for reading data from the balls at the start and/or at the end of a game;
(iii) means for switching on the balls at the start of a game and/or for switching the balls off at the end of a game;
(iv) a plurality of communication beacons distributed around the facility and which function with varying power levels; and/or
(v) a plurality of video cameras distributed around the facility for recording shots and one or more video display screens for replaying the shots.

According to a third aspect of the present invention, there is providing a method of operating a golf facility, preferably a golf facility in accordance with the second aspect of the invention, including a ball game apparatus using a plurality of coded balls, the method comprising one or more of the following steps:
(i) charging the batteries within the balls before a game;
(ii) reading data from the balls at the start of a game;
(iii) switching on the balls at the start of a game;
(iv) varying the power of communication from the beacons to the balls and from the balls to the beacons depending upon the position of the balls;
(v) recording golf shots with video cameras and replaying them on one or more video display screens;
(vi) reading data from the balls at the end of a game;
(vii) switching off the balls at the end of a game;
(viii) influencing parts of the apparatus by means of an application on a player's mobile telephone;
(ix) erasing data from a ball if it is removed from the facility.

According to a further aspect of the present invention, there is provided a ball game apparatus in which movements of a ball are detected and an automatic indication of a player's score is given, wherein a mobile communication device can be operated to influence the game. The mobile communication device may be a player's mobile telephone with a suitable downloaded application.

According to a further aspect of the present invention, there is provided a battery charging system for charging batteries contained within balls, the system comprising a plurality of battery charging locations each comprising means for holding a ball at a specific position, a sensor for detecting the presence of a ball at said position, a charging coil for inductively coupling with a coil in a held ball. Each location may also comprise means for detecting the temperature of a held ball.

According to a further aspect of the present invention, there is provided a ball game apparatus in which movements of a coded ball are detected by detector units and an automatic indication of a player's score is given, wherein data relating to the ball are stored in a database connected to the detector units, the data including the code of a ball and a code relating to a player to whom the ball has been allocated, the ball being configured to temporarily store, and to intermittently transfer to the detector units and thence to the database, data relating to the ball's movements. The database may also store data relating to a history of charging cycles which have been applied to a battery within the ball.

According to a further aspect of the present invention there is provided a ball game apparatus in which movements of a coded ball are detected by detector units, wherein the ball has a circuit which transmits signals which vary in power in dependence upon the current motion of the ball and/or each detection unit transmits signals which vary power in dependence upon the proximity of the nearest ball.

According to a further aspect of the present invention, there is provided a ball game apparatus, particularly in accordance with any of the preceding aspects, in which movements of a ball are recorded throughout the game by video cameras which are connected to a control centre for selected replay. One or more video screens may be distributed around a course on which the game is played, the screens being connected to one or more respective cameras and/or to the control centre for selected replay.

Preferred embodiments of the present invention will now be described, by way of example only, with reference to the accompanying drawings, of which;

Figure 1:
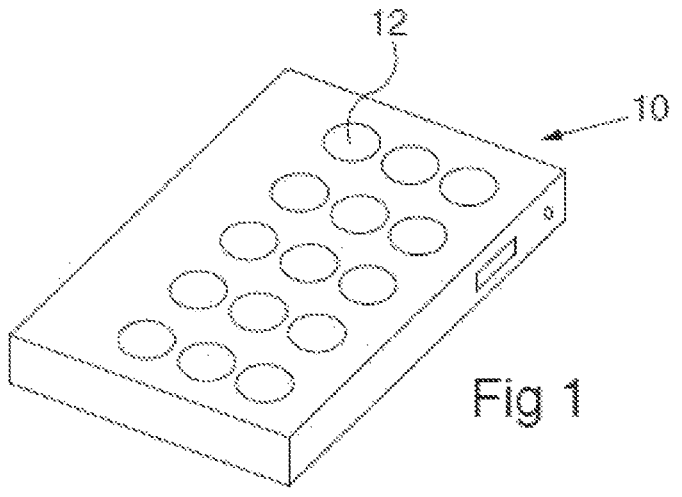
FIG. 1 is a perspective view of a tray used for holding golf balls in a device for charging batteries inside coded golf balls.

FIG. 1 shows a tray 10 used for charging balls used in the apparatus of the present invention. The balls each incorporate a rechargeable battery, an associated charging coil and a chip incorporating a memory and a microprocessor for controlling the battery-charging process. Each ball has a unique "ball" code which is permanently or substantially permanently assigned to each ball in the facility. Further details of the balls are given in our co-pending application number GB 1512038.9 entitled "Ball for Game".

Figure 2:
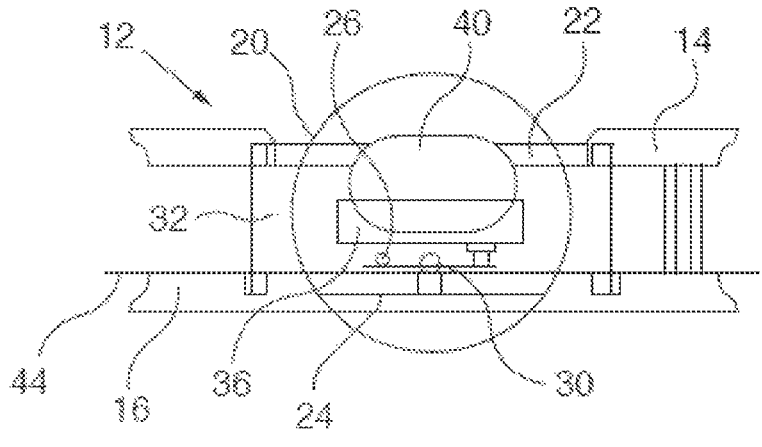
FIG. 2 is a side schematic view of one of the charging locations in the tray of FIG. 1, where the relationships between internal and external elements are shown.
Figure 3:
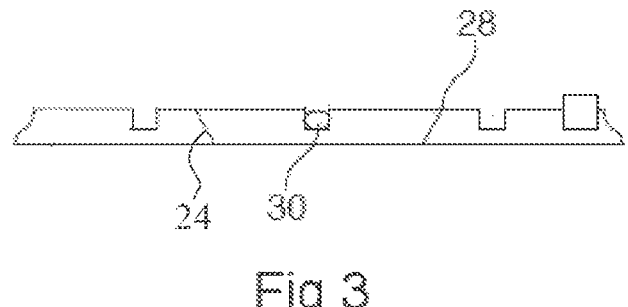
FIG. 3 is a view corresponding to the bottom of FIG. 2, with the golf ball removed.

The tray comprises a three-by-five array of sockets 12 for receiving balls. FIG. 2 shows a socket 12 in a side schematic view with a golf ball 20 inserted therein. The socket 12 is formed between a top layer 14 and a bottom layer 16, preferably spaced apart by 10 to 20 mm, preferably substantially 14.5 mm. The top layer incorporates a top hole 22 which is larger than a golf ball, so that the ball can easily pass therethrough. The bottom layer incorporates an orifice 24, of diameter 25 to 40 mm (preferably substantially 32 mm) in which an inserted golf ball sits. The circumference 28 of orifice 24 is provided with a 45 to 75 degree, preferably substantially 60 degree, bevel.

Aligned with the top surface of the bottom layer 16 and at or adjacent the edge 28 of the orifice 24 is an optical sensor 30 for detecting the presence of a golf ball.

Closely surrounding the ball 20 in the socket is a charging coil 32 for inductively coupling with a coil 26 within the ball to charge a battery 40 therein. The ball also includes an aerial coil 36 for communicating with other devices of the ball game apparatus.

The optical sensor 30 and the coil 32 are connected to a printed circuit board 44 located on the top surface of the bottom layer 16 and itself connected to a control device of the apparatus.

In use, golf balls which have been used in play are inserted in the sockets 12 of tray 10. The balls are quickly and accurately located in the bevelled orifices 24 so that they reliably interact with sensors 30 and coils 32. A plurality of, for example, six trays are stacked in respective shelves in a rack and connected up to the control device. Thus a single battery charger is capable of simultaneously charging up to ninety golf balls. The status of the ball in each socket is then assessed. In particular, the charger can monitor for each ball its temperature, voltage and state of charge. When each battery is fully charged, the charger stops charging it. The charger knows where each ball is within the charger, and how long it has been there.

The control device has means for indicating the detected status of each ball. If a ball is in its off condition, it is switched on by the socket 12 by means of a magnetically-operated switch within the ball.

It is assessed whether the ball is faulty in any aspect. It is assessed whether the battery within the ball is only partly discharged or substantially fully discharged; in accordance with the result of this assessment, the battery is subjected to charging at a low rate or a relatively higher rate. A typical charging cycle takes eight hours.

If a socket 12 is empty, then no charging current is connected to the respective coil 32; this conserves energy and is a safety feature in that excessive heating is avoided. The temperature at each socket and/or of each tray is detected and the charging rate profile is changed as necessary; it has been found that charging in pulses prevents the arrangement from overheating.

A central database, referred to below, stores a count of the number of times each ball has been charged. If the battery in the ball is subjected to a full charging procedure, this count is incremented by one; this enables a check to assess whether it is appropriate to dispose of the battery in a particular ball.

When the battery-charging procedure has been completed, the circuitry within each ball is switched to an "off" condition in which it is completely dormant. Before a ball is issued to a player, it is activated by an activator device of the ball game apparatus.

The ball game apparatus makes wireless communications with the balls via communication devices designated as "beacons" which are distributed around the facility. One example uses Bluetooth technology. (Bluetooth is a Registered Trade Mark). Each beacon has its own identification code which is used in all communications.

Figure 4:
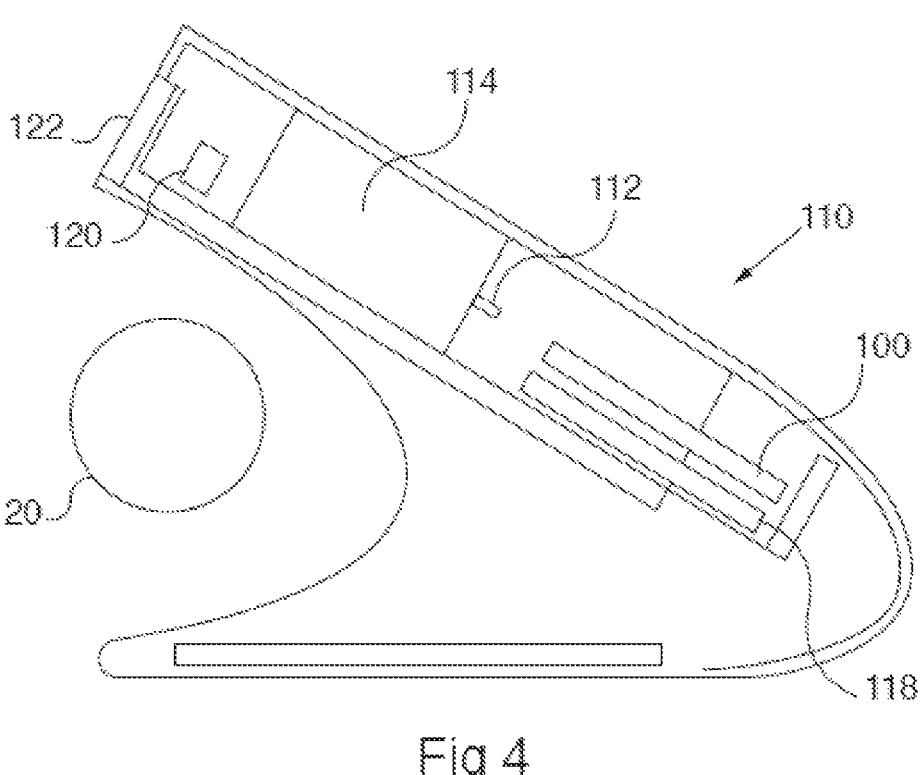
FIG. 4 is a side schematic view of an activating device for a coded golf ball, where relationships between internal and external elements are shown.

One such beacon 100 is employed in the portable ball activator unit 110 shown in FIG. 4 which can be located on a desk in the reception area of the facility. The device 110 comprises an aerial coil 112 which surrounds a cavity 114 and which is in communication with the beacon 100. The activator unit 110 is controlled by circuitry 118 incorporating a microprocessor which is also connected to the beacon 100.

The circuitry 118 is also connected to an indicator LED light 120 which is located behind a bezel 122.

The beacons 100 are all in communication with a central control unit which is associated with a membership database which retains all the players' details, current scores, previous scores, details of items purchased etc.

In use, and before a golf game is started, a ball 20 is inserted in cavity 114. The circuits within the ball and the beacon communicate with each other via coils 36 and 112. When the activator has detected the presence of ball circuitry which is switched off, it is then switched on for play. A player code is then associated with the ball so that, during a game of golf, the respective player can be unambiguously identified by the control unit via the beacons disposed around the facility. It should be noted that this player code is in addition to the previously mentioned ball code. This association of codes is effected by the central control unit in conjunction with the database.

At the same time, profiles can be assigned to the ball. One example of profiling is identifying whether the player using the ball is an adult or a child. If a ball is allocated to a child, the rules of the game may be simplified when applied to that ball. Other sorts of profiling relate to the particular golf course being played. The ball is then removed from the cavity and a putting game is subsequently played.

Figure 5:
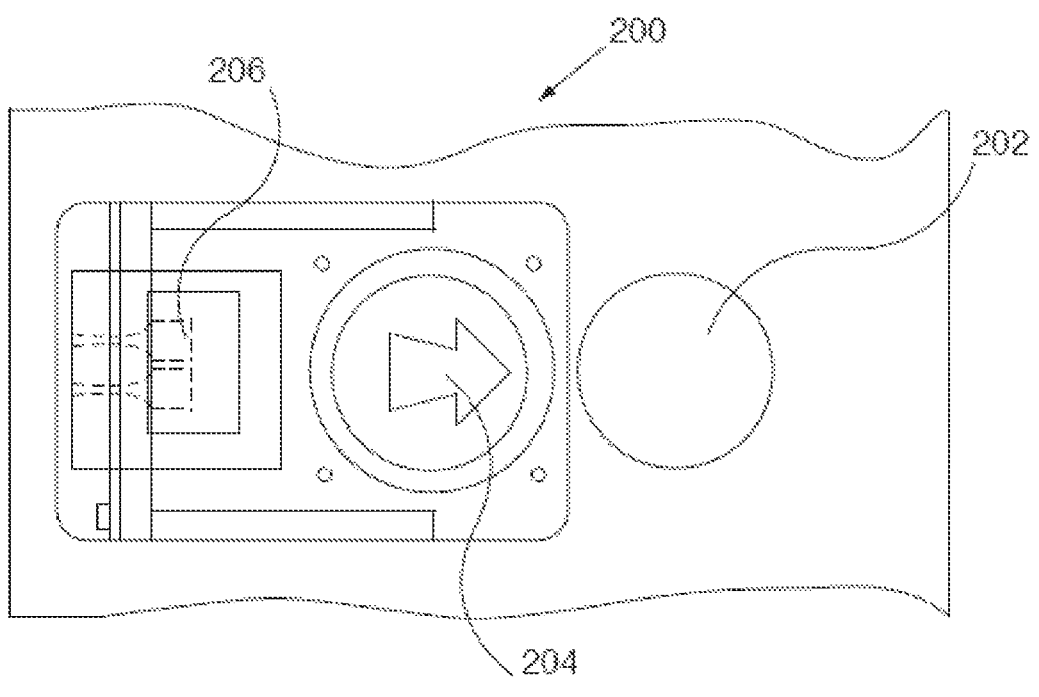
FIG. 5 is a top view of a tee area of a golf facility employing the ball game apparatus.

To start a putting game, the ball 20 is taken to the first tee area 200 of the course, shown in FIG. 5.

The tee comprises a ball placement area 202, the location of which is highlighted by an illuminated arrow 204. The presence and code of the ball 20 are detected by a respective beacon 206 located beneath ground level to one side of the ball placement area (including behind or in front of the ball placement area).

As the ball is struck during the putting game, movements of the ball are detected by beacons around the course as disclosed in WO 2013/156778 and the strokes are counted. The beacons can also detect movement of the ball into the hole on each green. However, for quicker and more accurate detection, each hole around the course includes an optical ball detector.

As the ball is moved around the golf course, communications with the adjacent beacon(s) depend upon the distance of the ball therefrom. The beacons serve as transponders passing information to and from the located ball.

Firstly, the ball is configured to transmit, for most of the time, data signals with low power and only to use higher power signals when necessary. This lengthens battery life and reduces signal clash or chatter between different devices, which in turn minimises interference delays. When the ball is not in play, it transmits with low power. When the ball is placed on the tee, it continues to transmit with low power, since it is located close to the beacon 206. It is only when the ball leaves the tee that is starts transmitting with high power so that is can be detected by the or each other beacon associated with that part of the golf course. Thus, if there are one hundred balls allocated to players, most of them at any one time transmit on low power and typically only eighteen on high power.

Secondly, the beacons also function with varying power levels. They are configured to passively receive data from the balls (and other devices) for most of the time, and only transmit information back, when required, and then at the lowest possible power level.

In use, when a ball is struck, it emits a signal to interrogate nearby beacons. Upon receiving this signal, a nearby beacon uses a dynamically-varying signal power strength to identify the location and distance of the aerial coil 36 in the ball. Using RSSI (received signal strength indication) techniques, the beacon can detect the proximity of a ball to an accuracy of between 10 cm and 10 m depending upon the system configuration. A beacon can use triangulation and/or trilateration techniques to refine location sensing.

The detection field for each beacon is shaped by the use of a tailored antenna design for use with 2.4 GHz and other frequencies. The beacon can be activated by the proximity of a ball, by an external sensor or another remote device. The beacon can emit polling signals when required. In addition to balls, they can detect any other device in the same system; in addition they can communicate with other beacons and other devices via direct wire, wirelessly or over the computer network.

At the end of a game, the ball may be reinserted in cavity 114. Appropriate data may be downloaded from the ball to the system and the ball is switched off.

The beacons adjacent the tee areas, the hole areas and around the course are connected to a central control unit in the form of a server. The use of more than one beacon to detect signals emitted by a ball enables the position of the ball to be more precisely triangulated. Since several games are played at the same time, clashes can arise between simultaneous messages from different beacons. In this case the server detects the clash and instructs the respective beacons to resend the message, but assigns different delay times to each beacon, so that the resent messages do not clash.

A preferred polling period for the beacons is 100 to 105 ms; in preferred embodiments this period can be varied.

Apparatus in accordance with the present invention is particularly suitable for use in a game of novelty golf having various dynamic features which can be altered. Thus at a particular stage of a game, the system may turn on a light.

If there is a particular feature which a player must negotiate to successfully complete a hole e.g. a bridge, then the system may move the bridge. The timing of such interventions takes into account the position of the ball and/or the level of difficulty applied to the player, e.g. adult/child. The timing may also take into account the current state of play, for example, if a particular player is in the lead, the system may make the game harder, e.g. by moving obstacles, for that player.

Magnets may be distributed around the course for example, where a ball can travel along one of, say, three paths to arrive at the hole, a different pattern of magnets can be located beneath each path. The paths may comprise different bridges and/or tunnels. The magnetometers or compasses contained in the balls can be used to detect which path is followed and supply the information to the server; the server can use the information to award extra points or to impose penalties or to alter the layout of the moveable features of the course. In some embodiments this is the sole or main purpose of the magnetometers or compasses within the balls, with the gyroscopes solely or mainly serving to monitor overall movements of the balls.

In a preferred embodiment, video cameras are distributed around the course. They are used to constantly record shots being played around the course. A video display screen in the reception area of the facility can be used to play back selected events. For example, if cheating is suspected, it can quickly be checked on screen. Moreover, if a prize is awarded for a special event, such as a hole-in-one on a particular hole, a claim can immediately be validated on screen. It is particularly preferred that every part of the course is video-monitored from the moment the ball is struck until it is in the hole. Thus, an entire round can be recorded and subsequently replayed (possibly speeded up) to check the score. Video replays can also be shared by players on social media.

One or more video display screens may be distributed around the course. In particular, each hole may have its own computer and screen combination including an associated beacon. If a particularly good shot is played, it may be detected by the beacons and immediately replayed on the display screen nearest to the relevant hole.

Various modifications can be made to the above-described embodiments.

With regard to the charging procedure, the battery may be in an "off" condition while it is being charged. Switching between the "on" and "off" conditions may be effected automatically upon detection of a voltage increase in the charging coil 32 rather than by a separate magnetic switch.

The beacon 206 at the tee area may be located underneath the ball placement area 202.

Instead of being portable, the activator device may be part of a fixed apparatus, for example a ball dispensing machine. After payment of a fee, and entry of relevant details of a player on a keypad, a ball 20 can be dispensed.

To avoid clashing of messages from different beacons, a frequency-hopping technique may be employed in addition to or as alternative to varying the delay time of subsequent messages.

The coded ball 20 can be used for additional purposes to playing a game. For example, it can be arranged to operate vending machines around the facility, e.g. to buy a drink or to purchase another game, with an appropriate charge being made to a player's account. It can also be used to control features of the game, in the manner of "playing a joker". Thus, in a points scoring game, one could present one's ball to a dedicated reading device adjacent to a hole to increase (eg double) one's score at that hole.

Playing of the game can be enhanced by implementing some or all of the above features, in addition to further features, on an application which can be downloaded to a player's mobile telephone or other mobile communications device. The playing of the game can be influenced in various ways. Examples are moving part of the golf course (either to make one's shot easier or to make an opponent's shot harder), switching on a fan to blow wind across the playing area, causing a model volcano to make an appropriate noise to distract an opponent.

An antenna arrangement may be provided at an exit to the facility to detect an attempt to steal a ball. A beacon may be incorporated into this arrangement so that the memory within the ball is erased or replaced with a code indicating unauthorised removal.

Features of the apparatus may be combined with or modified by any of the features disclosed in WO 2013/156778 and/or in co-pending application number GB 1512038.9 entitled Ball for Game, the contents of all of which are hereby incorporated by reference.

What is claimed is:

1. A golf game system, comprising:
a golf ball including a ball antenna, a rechargeable battery, and memory, wherein the memory is configured to temporarily store ball-movement data of the golf ball during a golf game;
a tray defining a ball-receiving socket for receiving the golf ball and including a charging coil adjacent the ball-receiving socket for inductively charging the golf ball via the ball antenna;
an activator unit including an activator antenna and configured to:
activate the golf ball before the golf game has been started when the golf ball is passed next to the activator antenna; and
subsequently deactivate the golf ball after the golf game has been completed when the golf ball is again passed next to the activator antenna;
detector units positioned along a course, wherein the detector units are configured to detect movement of the golf ball along the course while the golf game is played based on wireless communication with the ball antenna, wherein the ball-movement data of the golf ball is transferred to at least one of the detector units via the ball antenna;
a database connected to the detector units and associated with a central control unit, wherein the database is configured to store the ball-movement data of the golf ball and a player code associated with a corresponding player; and
a mobile phone configured to present a score of the player while the golf game is being played.

2. The golf game system of claim 1, wherein the database is configured to store a ball code designated for the golf ball and associate the player code of the player with the ball code of the golf ball.

3. The golf game system of claim 1, wherein the database is configured to store historical data indicative of charging cycles of the golf ball on the tray.

4. The golf game system of claim 1, wherein the central control unit is a server.

5. The golf game system of claim 1, wherein the activator unit comprises a beacon that is configured to communicate with the central control unit.

6. The golf game system of claim 5, wherein the activator unit comprises circuitry connecting the activator antenna and the beacon.

7. The golf game system of claim 1, wherein the tray further includes a sensor that is positioned adjacent the ball-receiving socket and is configured to detect a presence of the golf ball.

8. The golf game system of claim 1, wherein the ball antenna of the golf ball is configured to transmit a signal that varies in power based on movement of the golf ball to conserve power of the rechargeable battery.

9. The golf game system of claim 1, wherein the detector units are configured to transmit signals that vary in power based on proximity of the golf ball to the detector units to avoid interference with adjacent holes of the course.

10. A method for operating a golf game system, the method comprising:
inductively charging a golf ball on a tray, wherein the golf ball includes a ball antenna and a rechargeable battery, wherein the tray defines a ball-receiving socket for receiving the golf ball and includes a charging coil adjacent the ball-receiving socket for inductively charging the golf ball via the ball antenna;
activating the golf ball via an activator unit when the golf ball is passed next to an activator antenna of the activator unit;
detecting movement of the golf ball along a course while a golf game is played, wherein the movement of the golf ball is detected based on wireless communication between the ball antenna and detector units positioned along the course;
temporarily storing ball-movement data in memory of the golf ball;
transferring the ball-movement data via the ball antenna to at least one of the detector units;
storing the ball-movement data of the golf ball and a player code associated with a corresponding player in a database that is connected to the detector units and associated with a central control unit;
presenting a score of the player while the golf game is being played; and
deactivating the golf ball after the golf game has been completed when the golf ball is again passed next to the activator antenna of the activator unit.

11. The method of claim 10, further comprising storing, in the database, a ball code designated for the golf ball.

12. The method of claim 11, further comprising associating the player code of the player with the ball code of the golf ball in the database.

13. The method of claim 10, further comprising storing, in the database, historical data indicative of charging cycles of the golf ball on the tray.

14. The method of claim 10, further comprising varying a power of a signal transmitted by the ball antenna based on movement of the golf ball to conserve power of the rechargeable battery of the golf ball.

15. The method of claim 10, further comprising varying power of signals transmitted by the detector units based on proximity of the golf ball to the detector units to avoid interference with adjacent holes of the course.

16. The method of claim 10, further comprising recording movement of the golf ball via video cameras positioned along the course.

17. The method of claim 16, further comprising video screens that are positioned along the course and are configured to replay shots recorded by the video cameras.

18. An activator unit for a ball game, the activator unit comprising:

a body defining a cavity through which a ball is capable of traveling; and an activator antenna adjacent to the cavity, wherein the activator unit is configured to communicate with a ball antenna of the ball as the ball travels through the cavity to transition the ball between an "on" condition and an "off" condition, wherein the activator unit is configured to switch the ball from the "off" condition to the "on" condition at a start of the ball game to enable monitoring of the ball during the ball game, and wherein the activator unit is configured to switch the ball from the "on" condition to the "off" condition at an end of the ball game to stop the monitoring of the ball.

19. The activator unit of claim 18, further comprising a beacon configured to communicate with a central control unit.

20. The activator unit of claim 19, further comprising circuitry connecting the activator antenna and the beacon.

* * * * *